(12) United States Patent
Amini et al.

(10) Patent No.: US 12,231,919 B2
(45) Date of Patent: Feb. 18, 2025

(54) ADAPTIVE THERMAL MANAGEMENT IN WIRELESS COMMUNICATIONS SYSTEMS

(71) Applicant: MaxLinear, Inc., Carlsbad, CA (US)

(72) Inventors: Peiman Amini, Fremont, CA (US); Bahador Amiri, Saratoga, CA (US); Hector Lopez, Madrid (ES); Stephane Cattet, Paris (FR)

(73) Assignee: MaxLinear, Inc., Carlsbad, CA (US)

( * ) Notice: Subject to any disclaimer, the term of this patent is extended or adjusted under 35 U.S.C. 154(b) by 413 days.

(21) Appl. No.: 17/163,663

(22) Filed: Feb. 1, 2021

(65) Prior Publication Data

US 2021/0258804 A1     Aug. 19, 2021

Related U.S. Application Data

(60) Provisional application No. 62/976,610, filed on Feb. 14, 2020.

(51) Int. Cl.
| | |
|---|---|
| *H04W 24/02* | (2009.01) |
| *H04B 7/0413* | (2017.01) |
| *H04W 24/08* | (2009.01) |
| *H04W 84/12* | (2009.01) |

(52) U.S. Cl.
CPC .......... *H04W 24/02* (2013.01); *H04B 7/0413* (2013.01); *H04W 24/08* (2013.01); *H04W 84/12* (2013.01)

(58) Field of Classification Search
CPC ..... H04W 24/02; H04W 24/08; H04W 84/12; H04W 52/0206; H04W 28/08; H04B 7/0413; Y02D 30/70
See application file for complete search history.

(56) References Cited

U.S. PATENT DOCUMENTS

| | | | |
|---|---|---|---|
| 2010/0118784 A1* | 5/2010 | Goransson | H04B 7/0871 370/328 |
| 2010/0285828 A1 | 11/2010 | Panian et al. | |
| 2014/0045481 A1* | 2/2014 | Fraley | H04N 21/42202 455/418 |
| 2015/0286259 A1* | 10/2015 | Ermenko | G06F 1/206 700/300 |

(Continued)

*Primary Examiner* — Fred A Casca

(74) *Attorney, Agent, or Firm* — Buchalter; Jason W. Croft

(57) ABSTRACT

A method of adjusting operating configurations in a networking device to regulate thermal conditions in the networking device to be within a thermal range while optimizing service for the communication activity of networking device. Example implementations include analyzing communication activity of the one or more network interfaces to determine possible operating configurations to service the communication activity. In an example implementation, the possible operating configurations are learned based on the operating configurations and characteristics of the communication activity when the monitored thermal conditions leave and return the thermal range. Further, the one or more network interfaces of the device can be configured based on service levels for portions of the communication activity in order to regulate the thermal conditions. In some example implementations, instructions can be sent to another device communicating with the networking device to modify communications in order to regulate the thermal conditions.

19 Claims, 8 Drawing Sheets

(56) References Cited

U.S. PATENT DOCUMENTS

2016/0095087 A1\* 3/2016 Mohseni ............... H04W 72/02
  455/558
2017/0265141 A1\* 9/2017 Yang ..................... G06F 1/329
2020/0125148 A1\* 4/2020 Lee ...................... G06F 1/3206
2020/0127468 A1\* 4/2020 Hackl ................ H02J 7/00034

\* cited by examiner

ADAPTIVE THERMAL MANAGEMENT IN WIRELESS COMMUNICATIONS SYSTEMS

CROSS-REFERENCE TO RELATED APPLICATION

This application claims priority benefit of U.S. provisional application No. 62/976,610, which was filed on Feb. 14, 2020, and which is entirely incorporated by reference herein.

TECHNICAL FIELD

This disclosure pertains generally to wireless communications systems and particularly to managing thermal conditions in multi-input, multi-output (MIMO) communications systems.

BACKGROUND

Wi-Fi® circuits service a plurality of frequency ranges. With improvements in communication services, however, Wi-Fi circuits will increasingly be called upon to operate at higher frequencies and provide greater throughput. This increased demand may create undesirable thermal conditions in wireless communications systems. Thus, there is room for improvement in the art.

SUMMARY

Accordingly, there are disclosed herein wireless communications systems operable to manage workload of their constituents based on thermal conditions therein, and methods for doing the same.

Example systems and methods described herein include adjusting operating configurations in a networking device to regulate thermal conditions in the networking device to be within a thermal range while optimizing service for the communication activity (i.e. workload) of the networking device. Example implementations include analyzing communication activity of the one or more network interfaces to determine possible operating configurations to service the communication activity. In an example implementation, the possible operating configurations are learned based on the operating configurations and characteristics of the communication activity when the monitored thermal conditions leave and return the thermal range. Further, the one or more network interfaces of the device can be configured based on service levels for portions of the communication activity in order to regulate the thermal conditions. In some example implementations, instructions can be sent to another device communicating with the networking device to modify communications in order to regulate the thermal conditions.

In an example implementation, the networking device includes one or more wireless communication interfaces with operating configurations such as antenna selection, frequency band support, band steering, transmit duty cycles, etc. that can be adaptively controlled based on characteristics of the communication activity in order to reduce the temperature in the network device when it exceeds a threshold. For example, the networking device may support different frequency bands for communicating with one or more client devices, and to adaptively control the operating configurations, the device selects a frequency band with lower power consumption for one or more client devices to reduce the temperature of the networking device. In another example, the one or more communication interfaces can be for different types of wired and wireless communications. Example implementations can analyze the workload of the networking device and capabilities of the one or more client devices it is communicating with to determine if service to a client be switched to a different interface to improve thermal conditions while optimizing service.

DETAILED DESCRIPTION

Figure 1A:
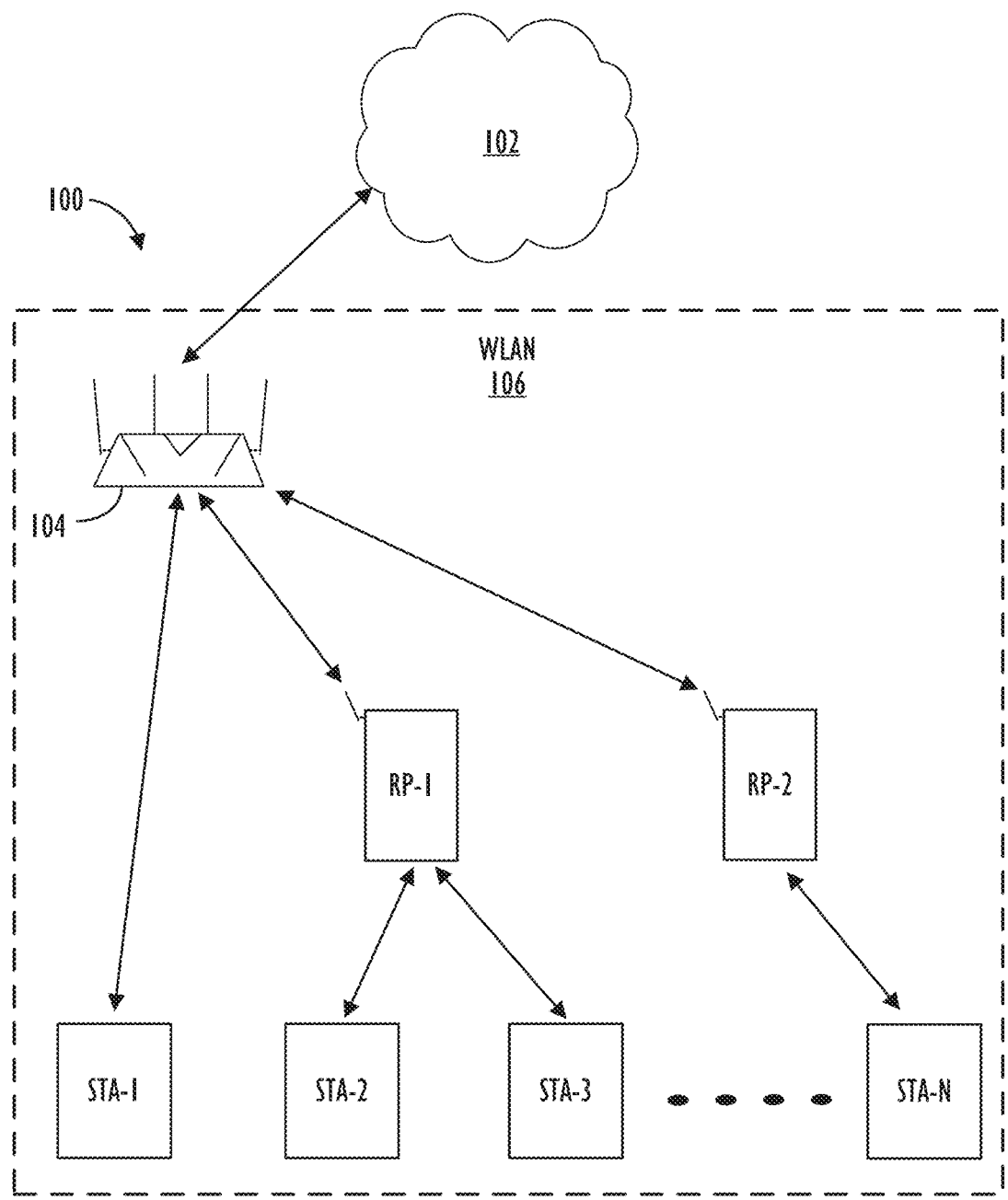
FIG. 1A is a block diagram of a wireless communications system, in accordance with an example of this disclosure.

The examples listed above and described herein are neither mutually exclusive nor collectively exhaustive. Specific configurations, parameter values, and examples are explanatory, not restrictive.

The figures and the following detailed description do not limit the disclosure, but on the contrary, they provide the foundation for understanding all modifications, equivalents, and alternatives falling within the scope of the appended claims. Reference numerals and descriptions of redundant elements between figures are omitted for clarity. Terms used throughout the description are provided as examples and are not intended to be limiting.

Home, office, and outdoor networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a convention-based standard for handling communications among multiple competing devices for a shared wireless communication medium on a selected one of a plurality of communication channels. The frequency range of each communication channel is specified in the corresponding one of the IEEE 802.11 protocols being implemented. Communications follow a hub and spoke model with a WAP at the hub and the spokes corresponding to the wireless links to each 'client' device.

Example aspects of this disclosure enable Wi-Fi chips to be integrated in small form factor devices which are thermally constrained. In some example implementations, software-based thermal management techniques enable Wi-Fi devices to improve thermal safety and performance.

An example apparatus can include a Wireless Access Point (WAP) or a station and incorporating a very-large-scale integration (VLSI) processor and program code to support. An example transceiver couples via an integral modem to one of a cable, fiber, or digital subscriber backbone connection to the Internet to support wireless communications, e.g. IEEE 802.11 compliant communications, on a Wireless Local Area Network (WLAN). The Wi-Fi stage includes a baseband stage, and the analog front end (AFE) and Radio Frequency (RF) stages. In the baseband portion wireless communications transmitted to or received from each user/client/station are processed. The AFE and RF portion handles the up conversion on each of transmit paths of wireless transmissions initiated in the baseband. The RF portion also handles the downconversion of the signals received on the receive paths and passes them for further processing to the baseband.

An example apparatus can be multiple-input, multiple-output (MIMO) apparatus supporting as many as N×N discrete communication streams over N antennas. In an example the MIMO apparatus signal processing units can be implemented as N×N. In various examples, the value of N can be 4, 6, 8, 12, 16, etc. Extended MIMO operation enables the use of up to 2*N antennae in communication with another similarly equipped wireless system. It should be noted that extended MIMO systems can communicate with other wireless systems even if the systems do not have the same number of antennae, though some of the antennae of one of the stations (STA) might not be utilized, reducing optimal performance.

In some examples, a transmit path/chain includes various discrete and shared components. A Wi-Fi medium access control (WMAC) component includes: hardware queues for each downlink and uplink communication stream; encryption and decryption circuits for encrypting and decrypting the downlink and uplink communication streams; medium access circuit for making the clear channel assessment (CCA), and making exponential random back-off and retransmission decisions; and a packet processor circuit for packet processing of the transmitted and received communication streams. The WMAC component has access to a node table which lists each node/station on the WLAN, the station's capabilities, the corresponding encryption key, and the priority associated with its communication traffic.

In at least one example, during a sounding interval one or more downstream links are probed to determine the channel characteristics (CSI). The CSI can be used in the feedback from the sounding the beamforming matrix for each link subject to the sounding is determined. The soundings can be conducted on a per link basis. CSI from the communication link can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

Each sounding or data packet for wireless transmission on the transmit path components to one or more stations is framed in the framer. Each stream is encoded and scrambled in the encoder and scrambler followed by demultiplexing in demultiplexer into separate streams. Streams are subject to interleaving and mapping in a corresponding one of the interleaving-mappers. Transmissions are spatially mapped with a spatial mapping matrix (SMM) in the spatial mapper. The spatially mapped streams from the spatial mapper are input to Inverse Discrete Fourier Transform (IDFT) components for conversion from the frequency to the time domain and subsequent transmission in the AFT and RF stage.

In some example implementations, an IDFT component is coupled to a corresponding one of the transmit path/chain components in the AFT RF stage for wireless transmission on an associated one of MIMO antenna. Specifically each IDFT component couples to an associated one of the digital-to-analog converters (DAC) 550 for converting the digital transmission to analog, filters, upconverters, coupled to a common voltage controlled oscillator (VCO) for upconverting the transmission to the appropriate center frequency of the selected channel(s), and power amplifiers for setting the transmit power level of the transmission on the MIMO antenna array.

The receive path/chain includes the following discrete and shared components. Received communications on the WAP's array of MIMO antenna are subject to RF processing including downconversion in the analog front-end radio frequency (AFE)-RF stage. There can be six receive paths each including the following discrete and shared components: low noise amplifiers (LNA) for amplifying the received signal under control of an analog gain control (AGC) (not shown) for setting the amount by which the received signal is amplified, downconverters coupled to the VCO for down-converting the received signals, filters for bandpass filtering the received signals, analog-to-digital converters (ADC) for digitizing the down-converted signals. In an example implementation, an optional sampler 568 at the output of the ADCs allows sampling of the received Wi-Fi signals in the time domain, for subsequent Wi-Fi spatial diagnostics by the processor and non-volatile memory. The digital output from each ADC is passed to a corresponding one of the discrete Fourier transform (DFT) components in the baseband portion of the Wi-Fi stage for conversion from the time to the frequency domain.

Receive processing in the baseband stage can include various shared and discrete components including an equalizer to mitigate channel impairments which is coupled to the output of the DFTs. The received Wi-Fi signals in the frequency domain from the output of the DFTs either, with or without equalization, can be provided to the processor and non-volatile memory. The received Wi-Fi streams at the output of the equalizer are subject to de-mapping and deinterleaving in a corresponding number of the de-mappers and de-inter-leavers. Next the received stream(s) are multiplexed in multiplexer and decoded and descrambled in the decoder and descrambler component, followed by de-framing in the de-framer. The received communication is then passed to the WMAC component where it is decrypted with the decryption circuit and placed in the appropriate upstream hardware queue for upload to the Internet.

A computer-readable storage medium implementation may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any specific programming language. The instructions of the programming language(s) may be executed by one or more processing devices, e.g., central processing units (CPUs), processors, or controllers.

The operations described above and in various example implementations can be performed by hardware, software, or some combination of software and hardware. Various aspects of the example implementations may be implemented using circuits and logic devices (hardware), while other aspects may be implemented using instructions stored on a machine-readable medium (software), which if executed by a processor, can cause the processor to perform a method to carry out implementations of the present application. The components and processes disclosed herein may be implemented singly or in combination by hardware, circuits, firmware, software, or a processor executing computer program code.

Driving a radio in a higher frequency band allows more data to be transferred but doing so also creates more heat. In at least one example implementation, a wireless base station may manage thermal conditions by operating some radios in a linear range when communicating with stations that require optimal performance, while operating some radios in a non-linear range when communicating with stations for which lower performance levels are acceptable.

In some example implementations, temperature sensors located on-chip turn off certain functional blocks depending on the temperature readings. Example technical benefits, as described herein, include improved performance and efficiency such that compact Wi-Fi circuits with state of the art processing can efficiently and safely operate in devices without the need for heat sinks or fans. In some examples, certain device components are allocated less power when surface temperatures of device enclosures exceed certain levels or thresholds. In some examples, an amount of power allocated to one or more power amplifiers (PA) is reduced or throttled based on temperatures in wireless base station or repeaters (RP).

In some example implementations, an error vector magnitude (EVM) of a transmitting device can be adjusted to thermal output/temperatures of components. EVM is sometimes also called a relative constellation error (RCE). EVM is a measure used to quantify the performance of a digital radio transmitter or receiver.

A signal sent by an transmitter or received by a receiver may have all constellation points precisely calibrated for ideal locations, however various environmental or operational factors (e.g., carrier leakage, low image rejection ratio, phase noise, etc.) typically cause the actual constellation points to deviate from the ideal locations. EVM can also be used to measure distance or proximity of constellation points from the ideal locations. In at least one example, EVM calculation can represent a difference between ideal and actual points at various moments that can be normalized. In some examples, radios operating with lower error rates and higher signal quality typically produce increased thermal output. Transmitters with higher EVM can produce more heat than transmitters with lower EVM. In some example implementations, EVM is lowered for a radio or transmitter (at least temporarily) to reduce heat production.

In example implementations, a thermal software process is used to opportunistically control operating parameters to regulate thermal dissipation, thereby mitigating thermal conditions that can impair performance, efficiency, costs, and safety in operating the wireless networking device. For example, control of operating parameters can include changing a MIMO configuration, EVM, transmitter duty cycle combined with steering clients from one or more bands to one or more bands, etc. In an example, a PA bias voltage of one or more transmitters is lowered based on thermal conditions. In some examples, duty cycles (e.g., a fraction of one period in which a signal or system is active) of one or more transmitters are adjusted based on thermal conditions.

In some example implementations, under out of bound temperature conditions of a thermal range, software induces one or more thermal control scheme. Thermal control schemes can include procedures or routines to adjust configurations (e.g., reducing a quantity of transmit chains, e.g., from 8×8 to 4×8, from 8×8 to 2×8, from 4×4 to 2×4, and from 4×4 to 1×4, adjusting transmitter duty cycles, adjusting a maximum packet duration for one or more transmitters, etc.), switching a radio from operating a radio in a first MIMO mode (e.g. 8×8) to operating in a second MIMO mode (e.g. 4×8). In at least one example implementation, a transmitter's duty cycles are tracked over sliding windows, and in event the duty cycles exceed a predetermined percentage, transmitting of data frames may be reduced or stopped until the transmitter's duty cycle goes to a better level.

Moreover, the thermal control scheme can be deployed on existing hardware without changes to assembled physical components and/or with minimal additional sensors. The thermal control scheme can be optimized with pre-existing physical components of an access point and executed be a processor and/or Wi-Fi chipset to significantly improve the thermal output, power costs, performance, and/or safety of the networking device. As described herein, the thermal control scheme can account for specific networking capabilities and performance levels of different networking interfaces (e.g., Wi-Fi, Ethernet, USB, Bluetooth, Zigbee, etc.) in a networking device. The thermal control scheme is determined based on the resources and operating conditions (e.g., power amplifier) of the networking device (e.g., access point) as well as networking communication activity (e.g., communication service levels, station capabilities, traffic types, etc.) of devices operatively connected to the networking device.

An example implementation includes monitoring thermal conditions in a communications device including one or more network interfaces, analyzing communication activity of the different network interfaces to determine possible operating configurations to service the communication activity, and in view of a thermal range, adaptively controlling the operating configurations to regulate the thermal conditions in the communications device to be within the thermal range while optimizing service for the communication activity.

In an example, analyzing communication activity can include identifying one or more protocols, traffic type, service levels, or client capabilities associated with portions of the communication activity. Where the communication activity includes wireless communication with client devices, adaptively controlling the operating configurations can include transmitting instructions to one or more of the client devices. The instructions can indicate for the client to switch to a different frequency band, different protocol, etc. for subsequent communication with the wireless networking device. By analyzing communication activity and capabilities of the client devices, different communication paths or configurations can be identified for maintaining a level of communication services for the clients that reduce and improve thermal load of the access point thereby avoiding the access point from overheating, shutting down, and ceasing all communication. The communication services with different clients can be optimized across the available interfaces based on the client capabilities. The different network interfaces can include one or more Wi-Fi, Bluetooth, cellular, Zigbee, USB, or ethernet interfaces, etc. Further, for each interface and/or interface type, there are additional control determinations for configurations the operating parameters that could be impacting the thermal conditions of the access point.

Determining the possible operating configurations can include modeling thermal changes of components in the networking device for different control schemes based on characteristics of the analyzed communication activity. In an example implementation, different parameters of a network interface can be checked as compatible with characteristics or services of the analyzed communication activity.

Examples of possible operating configurations are further described below. Some example operating configurations that are likely to correspond with reducing thermal conditions include reducing an error vector magnitude for a radio of an interface, reducing power allocated to one or more transmit chains of a radio of an interface, or operating a power amplifier at non-linear range. In an example implementation, operating configurations for a wireless interface can consider different MIMO modes using different quantities of transmit antennas that are assigned corresponding thermal condition impact factors and service level impact factors.

In an example implementation, the possible operating configurations are learned based on the operating configurations and characteristics of the communication activity when the monitored thermal conditions leave and return the thermal range. In one embodiment, software is used that receives training data that includes a plurality of positive examples of operating configurations or control schemes with corresponding thermal indicators and a plurality of negative examples of operating configurations or control schemes with thermal indicators for machine learning. The processor then analyzes the training data set using machine learning to train a machine learning-based detection (MLD) control schemes profile that can be used to classify combinations of configurations and calculate thermal metrics for the MLD control schemes. In another embodiment, when the monitored thermal conditions leave and return the thermal range to learn possible operating configuration, the learning module can inventory or catalog the operating configurations for each component of the networking device, characteristics of the communication activity on each component and/or interface and thermal conditions.

Adaptively controlling the operating configurations can include reconfiguring parameters of the different network interfaces. For example, adaptively controlling the operating configurations can include directing a portion of the communication activity to a different interface of the different network interfaces. Selecting from the operating configurations from the possible operating configurations can be based on the difference between the monitored thermal conditions and the thermal threshold in view of service levels for portions of the communication activity.

Adaptively controlling the operating configurations can include combinations of controls such as changing power amplifier operating parameters based on the monitored thermal conditions, capping a duty cycle for a specific communication client, switching a frequency band for a portion of communication activity, adjusting power allocated to one or more transmit chains of one or more radios, changing a protocol governing a portion of the communications activity to an older compatible version of the protocol, etc.

In an example implementation, adaptively controlling the operating configurations can include adjusting power allocated to one or more transmit chains of one or more radios, and changing a MIMO order of at least one of one or more radios for a wireless network interface. Optimizing service for communication activity can factor in minimal service levels for portions of the communication activity and/or parameters of the one or more networking interfaces.

The thermal range can be adjusted based on ambient temperature external to the communications device. The networking device may include a number of sensors or may requested a temperate reading such as from an IoT device in proximity to the networking device or a remote Internet weather service when located outdoors.

In an example implementation, the thermal control scheme adjustment of operating configurations can include capping of transmit duty cycles for specific client devices. For examples, client devices at long range sometimes cause the most power dissipation. Thus, duty cycles for those client devices may be limited when required to manage thermal conditions. In some examples, client devices are prompted to use a repeater (RP) using EasyMesh™ or some other protocol. Some thermal control schemes involve moving client devises from a frequency band with higher power consumption to a frequency band with lower power consumption (e.g., from 5 GHz to 2 GHz, or 6 GHz to 5 GHz, or 6 GHz to 2 GHz). Another thermal solution includes moving one or more client devices from operating according to a given protocol to operating in a different protocol, for example from Wi-Fi to long term evolution (LTE) or other protocols, or from using a given IEEE 802.11 standard to an earlier IEEE 802.11 standard.

In some example implementations, a client device is steered from one radio or repeater of a WAN to another for thermal mitigation. In at least one example, 802.11V basic service set (BSS) transition management is used to move client devices to a less thermally challenged radio. In some examples, a multi-band operation (MBO) protocol may be used to move client devices. In some instances, a client device or mesh will be disconnected to address a thermal issue.

Example thermal control scheme can also include making changes in power amplifier operating parameters. For example, at high temperatures, a back-off of a PA may be reduced, which will reduce EVM, which can be appropriate for longer range client devices which do not need high EVM. In at least one example, a transmitter or radio will be caused to alter the transmitter or radio's digital pre-distortion (DPD) functions to reduce heat production.

In accordance with some example implementations, the control scheme applied with depend on the needs of one or more client devices. For example, if reducing transmitter duty cycle is more appropriate for a given client device than reducing a number of transmit chains, the number of transmit chains will not be reduced until it is determined (e.g., by one or more processors) that reducing duty cycles has not caused temperatures to be sufficiently reduced. In some examples, control scheme will be implemented in radios operating in higher frequency bands (e.g., 5 gigahertz (GHz)) before being implemented in radios operating in lower frequency bands (e.g., 2.4 GHz).

Example thermal control schemes can also include changes to operation of non-wireless circuits. For example, an Ethernet speed of a system can be reduced (e.g., from 10 GHz to 2.5 GHz or to 1 GHz) and/or certain universal serial bus (USB) ports can be dropped from service (e.g., from USB 3.0 to USB 2.0 or USB 1.0) to reduce operating temperature. In at least one example, a device such as a wireless base station or repeater will power off if other control schemes are inadequate.

Example implementations also pertain to managing thermal conditions of a multi-band wireless base station, a wireless router, a wireless access point, etc. that includes more than one wireless radio in the same frequency band. In some examples, the multi-band wireless base station operates at multiple frequency bands, e.g., 2.4 GHz. 5 GHz and 6 GHz. The wireless base station can include multiple radios which can operate in the same frequency band. In some examples, the wireless base station has one radio for a first frequency band and other radios for other frequency bands. The wireless base station may have two or more radios which communicate in the same frequency band with different client devices (e.g., stations and repeaters (RP)) at different times or using different modulation schemes. In some examples, the wireless base station can have two radios for the 5 GHz frequency band, with one radio for a lower frequency range of the 5 GHz frequency band, e.g., 5180 megahertz (MHz), and another radio for a higher frequency range of the 5 GHz frequency band, e.g., 5825 MHz. In some examples, the wireless base station is a wireless access point and may be operated as a traditional access point, a soft access point, a device in peer to peer connection, or other forms of access points.

The stations can connect to a wireless base station using any appropriate frequency band based on the capability of the radios of the wireless base station, the stations, and the repeaters (RP). For example, a dual-band station that operates at 2.4 GHz or 5 GHz can connect to the wireless base station over the 2.4 GHz or 5 GHz frequency bands. In some examples, if a station is connecting over the 5 GHz frequency band, it can connect using either a first sub-band or a second sub-band or a third sub-band, etc. of the 5 GHz frequency band. In a tri-band station example, that STA operates at 2.4 GHz or 5 GHz or 6 GHz and can connect to the wireless base station over the 2.4 GHz or 5 GHz or 6 GHz frequency bands. In some examples, if a station is connecting over the 6 GHz frequency band, it can connect using either a first sub-band or a second sub-band or a third sub-band, etc. of the 6 GHz frequency band. In some examples, the wireless base station determines the sub-band to which a specific station will be assigned or will use. In some examples, the wireless base station determines which repeater a station will use to communicate with the wireless base station.

In some examples, the wireless base station determines which access point a station will use based on thermal conditions at a repeater. In some examples, the wireless base station determines which frequency band a station will use to communicate with a repeater based on thermal conditions at the repeater. In some examples, the wireless base station determines which frequency band a station will use to communicate with a repeater based on thermal conditions at a different repeater. In some examples, the wireless base station determines which frequency band a station will use to communicate with the wireless base station based on thermal conditions at the wireless base station. In some examples, the wireless base station determines which radio of the wireless base station a station will use to communicate with the wireless base station based on thermal conditions at the wireless base station, including thermal conditions of one or more radios of the wireless base station. Once a station is assigned to a specific frequency band or sub-band, the station can continue to connect using the same frequency or sub-band for subsequent connections. However, in some examples, a station may be moved from one frequency or sub-band to another frequency or sub-band, if thermal conditions of the wireless base station or of one or more repeaters change.

FIG. 1A is a block diagram of a wireless communications system 100 coupled to a communication network 102 of a multi-band wireless base station 104, in accordance with an example of this disclosure. The wireless communications system 100 includes the wireless base station 104 (e.g., a wireless access point) and client devices. The client devices include a number of stations (e.g., logical entities that are singly addressable instances of a medium access control/physical layer interface to a wireless medium) and a number of repeaters, (e.g., stations that repeat the signal of a multi-band wireless access point, such as wireless base station 104). The wireless base station 104 enables the stations and repeaters to access the communication network 102 or to access one of the other devices (e.g., stations or repeaters). The wireless base station 104 and the stations and repeaters which are coupled to the wireless base station 104 form a wireless local area network (WLAN) 106. The wireless communications system 100 includes the wireless base station 104, the stations, the repeaters, and the WLAN 106 formed thereby. The wireless base station 104 operates at multiple frequency bands (e.g., 2.4 GHz, 5 GHz, 6 GHz, etc.). The communication network 102 can include the Internet, an intranet, a WLAN, etc. The wireless base station 104 enables the STA and RP to access resources connected to the communication network 102 and/or to communicate with other STAs and/or RPs of WLAN 106.

Figure 1B:
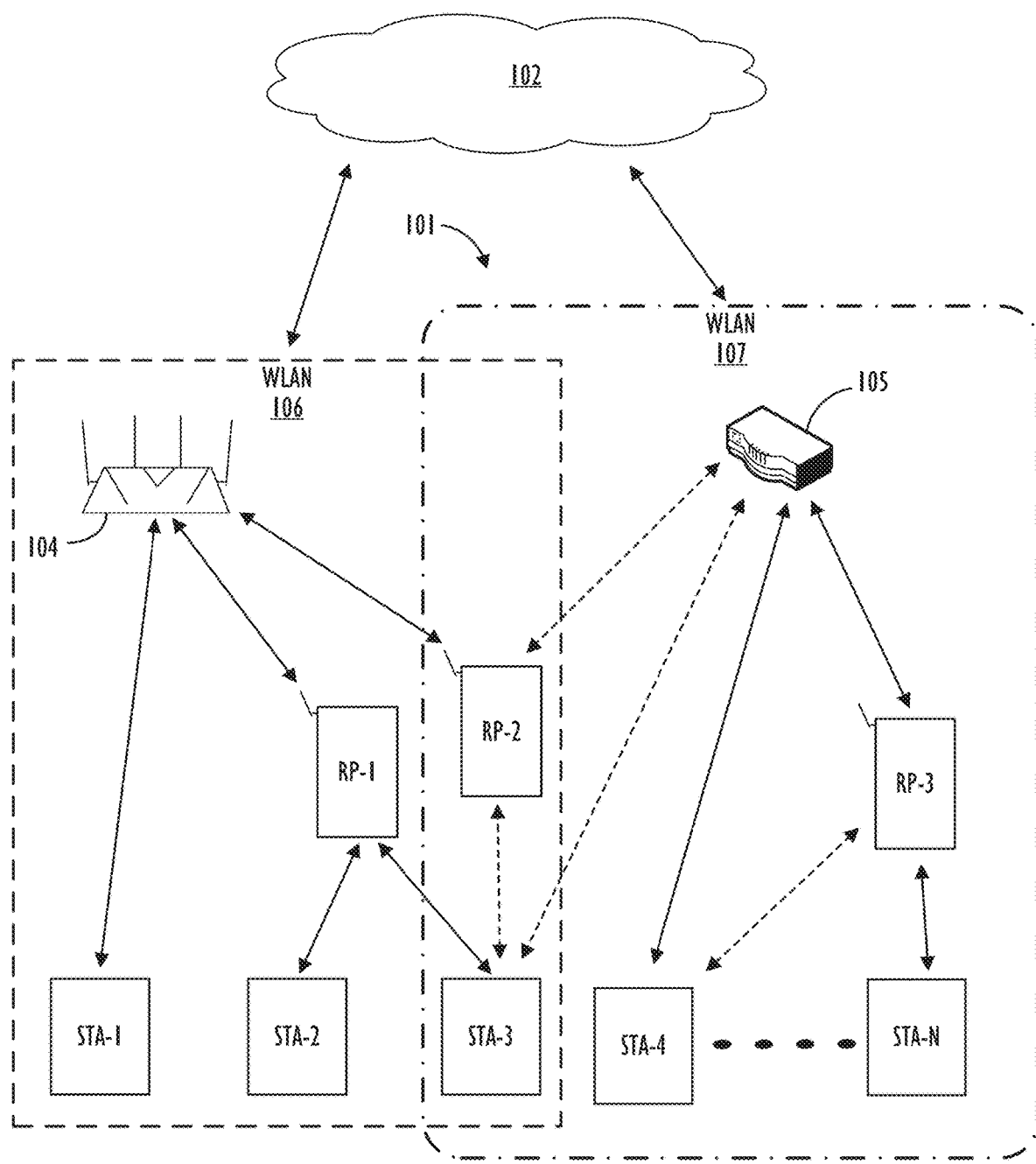
FIG. 1B is a block diagram of another wireless communications system, in accordance with an example of this disclosure.

FIG. 1B is a block diagram of another wireless communications system 101 coupled to the communication network 102. Wireless communications system 101 includes WLAN 106 and the client devices which form WLAN 106, as well as a second wireless local area network, WLAN 107. Like WLAN 106, WLAN 107 includes a wireless base station 105, and like wireless base station 104, wireless base station 105 enables client devices to access the communication network 102 or to access one of the other client devices of WLAN 107. The communication network 102 enables the stations and repeaters of WLAN 107 to communicate with various resources connected to the communication network 102. Wireless base station 105 enables stations and repeaters to access the resources connected to the communication network 102 and to communication with other stations and/or repeaters of WLAN 107. WLAN 106 and WLAN 107 overlap. In FIG. 1B, repeater RP-2 is shown to be in signal communication with wireless base station 104, but in some example implementations, repeater RP-2 could be placed in signal communication with wireless base station 105; doing so could be part of a solution to a thermal problem (e.g., repeater RP-2 may be causing a radio of wireless base station 104 to become too hot) Likewise, although station STA-3 is communicating with wireless base station 104 (through repeater RP-2), client station STA-3 could be placed in signal communication with wireless base station 105. Additionally, if repeater RP-2 were in signal communication with wireless base station 105, station STA-3 could be placed in signal communication with wireless base station 105 through repeater RP-2. These examples are illustrative, not limiting. So, for example, station STA-4 could be steered from communicating directly with wireless base station 105 to using repeater RP-3 to communicate indirectly with wireless base station 105. Steering a client device (e.g., station STA-3) communicating with a radio of a wireless base station (e.g., 104) or repeater (e.g., RP-1) to communicate with a radio of a different base station (e.g., 105) or repeater (e.g., RP-2).

Examples of stations include, but are not limited to, cell phones, smartphones, tablets, laptops, and desktop, media streaming devices, other wireless base stations, and any other device that is capable of communicating with a wireless base station 104, 105. It will be evident to those of skill that each station comprises at least one radio corresponding to that station. In some example implementations, stations can communicate with a wireless base station 104, 105 using a wired connection. In some example implementations, stations can communicate with a wireless base station 104, 105 wirelessly. In some examples, the stations communicate with a repeater wirelessly. Some or all the stations can communicate with a wireless base station 104, 105 through the repeaters. Examples of repeaters include, but are not limited to, a wireless router, a relay station, and a transceiver unit. It will be evident to those of skill in the art that each repeater comprises at least one radio corresponding to that repeater. Examples of wireless base stations 104, 105 can include a wireless router, a wireless access point, a wireless gateway, etc. In some examples, the repeaters enlarge the effective communications range of a wireless base station 104, 105. In some examples, the repeaters enlarge the area of the WLAN 106. In at least some examples, the repeaters enable more stations to communicate with a wireless base station 104, 105 than would otherwise be the case. The stations can communicate with a wireless base station 104, 105 or another station in the WLAN 106 over one or more frequency bands.

Figure 2:
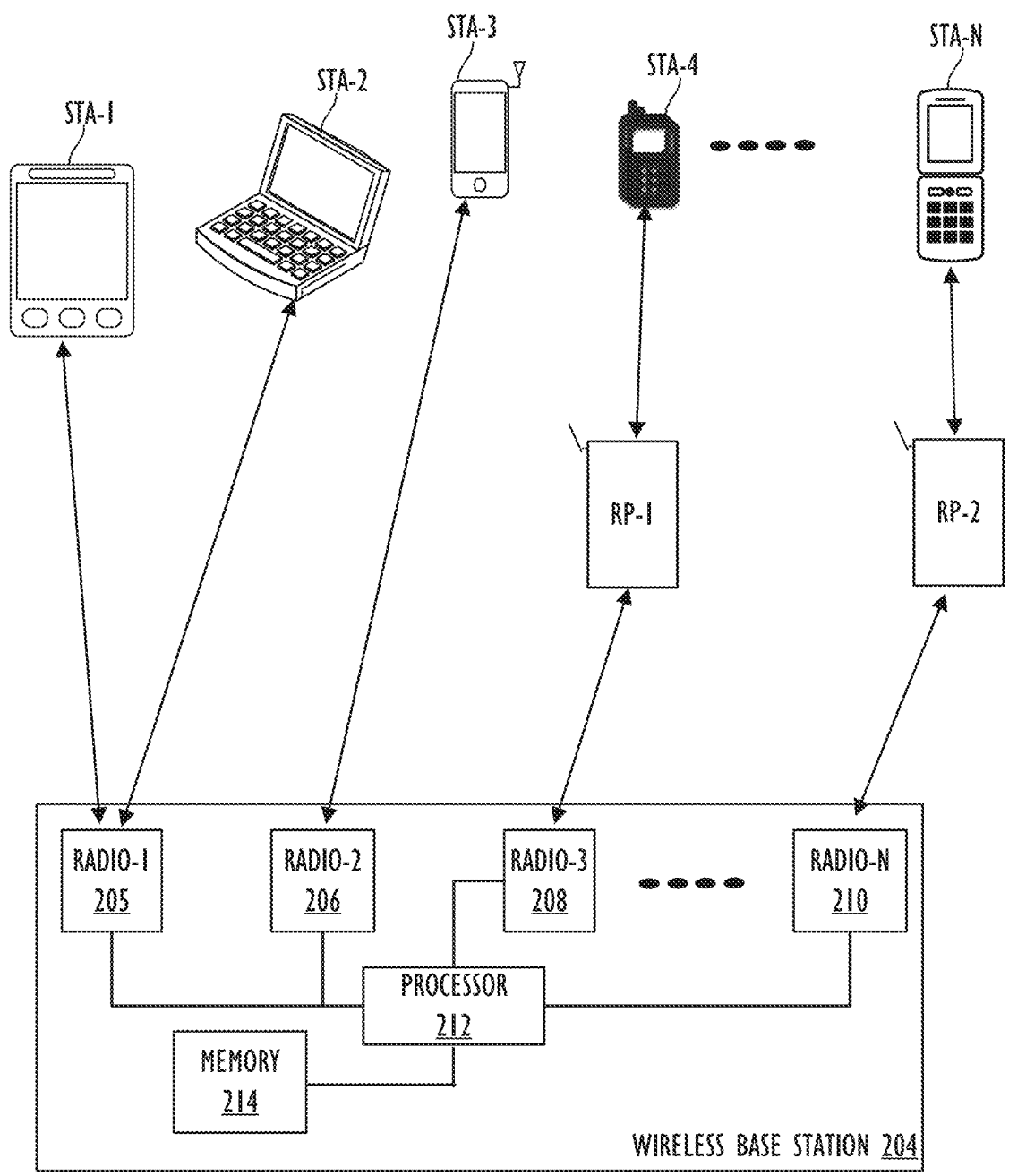
FIG. 2 illustrates an operational environment of a wireless base station, in accordance with an example of this disclosure.

FIG. 2 illustrates an operational environment 200 of a wireless base station 204 (e.g., 104, 105), in accordance with an example of this disclosure. The wireless base station 204, which is operable in multiple frequency bands, is shown in signal communication with stations and repeaters. The stations (STA-1 to STA-N) can wirelessly connect to and/or communicate with the wireless base station 204 and/or repeaters and/or one or more other stations over multiple frequency bands. The wireless base station 204 includes a first radio (e.g., 205) operable in a first frequency band (e.g., frequency band X) and second and third radios (e.g., 206, 208) operable at a second frequency band (e.g., frequency band Y). The frequency bands X and Y can be any of permissible frequency bands used for wireless communication. In some examples, the second radio 206 operates in a first sub-band of the frequency band Y and the third radio 208 operates in a second sub-band of the frequency band Y. In some examples, the first sub-band and the second sub-band of frequency band Y are distinct frequency bands.

In at least one example, the wireless base station 204 includes a first radio (e.g., 205) operable at 2.4 GHz, a second radio (e.g., 206) operable in a lower 5 GHz frequency band, a third radio (e.g., 208) operable at a higher 5 GHz frequency band, and an Nth radio (e.g., 210) operable at a higher frequency band. In at least one example, the Nth radio 210 operates in a 6 GHz frequency band.

In one or more example implementations, station STA-1 and station STA-2 communicate with the wireless base station 204 in a 2.4 GHz frequency band, and station STA-3 communicates with the wireless base station 204 in a low 5 GHz frequency band. In at least one example, repeater RP-1 communicates with the third radio 208 in a high 5 GHz frequency band. In some examples, repeater RP-2 communicates with the Nth radio 210 in a 6 GHz frequency band. In some examples, station STA-4 communicates with repeater RP-1 in the same frequency band that repeater RP-1 uses to communicate with the third radio 208. In some examples, station STA-4 communicates with repeater RP-1 in a different frequency band than repeater RP-1 uses to communicate with the third radio 208. In some examples, station STA-N communicates with repeater RP-2 in the same frequency band that repeater RP-2 uses to communicate with the Nth radio 210. In some examples, station STA-4 communicates with repeater RP-2 in a different frequency band than repeater RP-2 uses to communicate with the Nth radio 210. The wireless base station 204 also includes at least one host processor 212 coupled to a memory 214. Various operations of the radios 205, 206, 208, 210 corresponding to wireless base station 204 can be controlled by the host processor 212. In one or more example implementations, the host processor 212 controls the radios 205, 206, 208, 210 by executing instructions stored in a non-transitory computer readable medium (e.g., memory 214).

Figure 3:
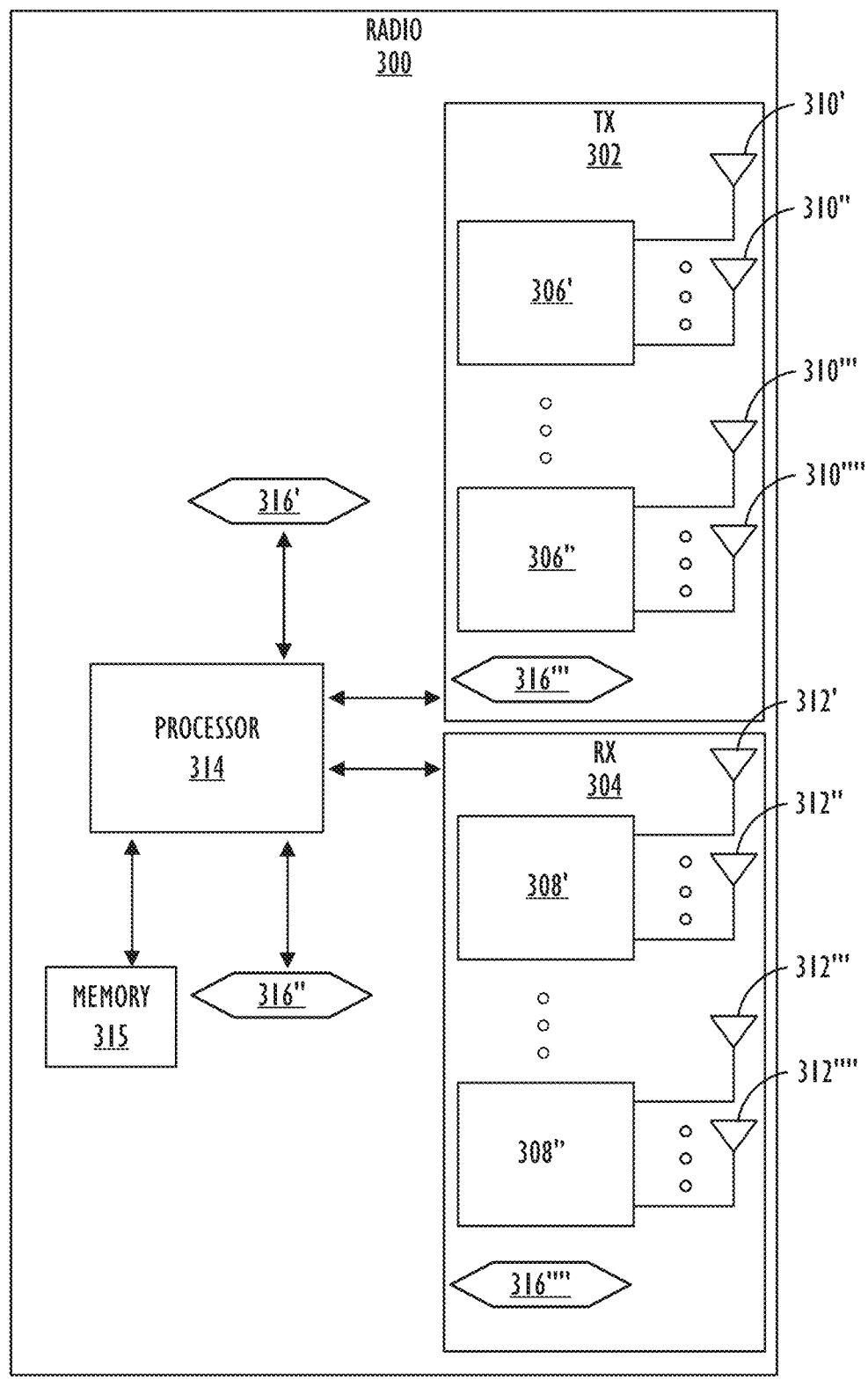
FIG. 3 illustrates a radio, in accordance with an example of this disclosure.

FIG. 3 illustrates a radio 300 (e.g., 205, 206, 208, 210), in accordance with an example of this disclosure. Radio 300 includes a transmit circuit 302 and a receive circuit 304. Transmit circuit 302 includes a plurality of transmitters 306 and receive circuit 304 includes a plurality of receivers 308. Each of the transmitters 306 includes one or more transmit antennas 310, and each of the receivers 308 includes one or more receive antennas 312. The transmit circuit 302 and the receive circuit 304 are controlled by a processor 314. The processor 314 can be a host processor (e.g., 212), such as a central processing unit (CPU) or a digital signal processor (DSP). In some examples, the transmit circuit 302 and the receive circuit 304 are controlled by processor 314 in accordance with instructions retrieved from a memory 315 (e.g. 214) as shown. In at least one example, memory 315 comprises a non-transitory computer readable medium. The radio 300 includes one or more temperature sensors 316. One or more of the temperature sensors 316 may be thermal sensors. One or more of the temperature sensors 316 can be operable to transmit a signal to the processor 314 indicative of a current temperature at a location within the radio 300. One or more of the temperature sensors 316 can be operable to transmit a signal to the processor 314 when one or more specific temperature readings are detected by one or more of the temperature sensors 316. In some example implementations, the processor 314 communicates with host processor 212 (see FIG. 2). In some examples, the processor 314 communicates temperature information (TI) detected using one or more of the temperature sensors 316. In at least one example, the temperature sensors 316 communicate directly with host processor 212. In some examples, one or more functions of the transmit circuit 302 and the receive circuit 304 are controlled directly by host processor 212.

Figure 4:
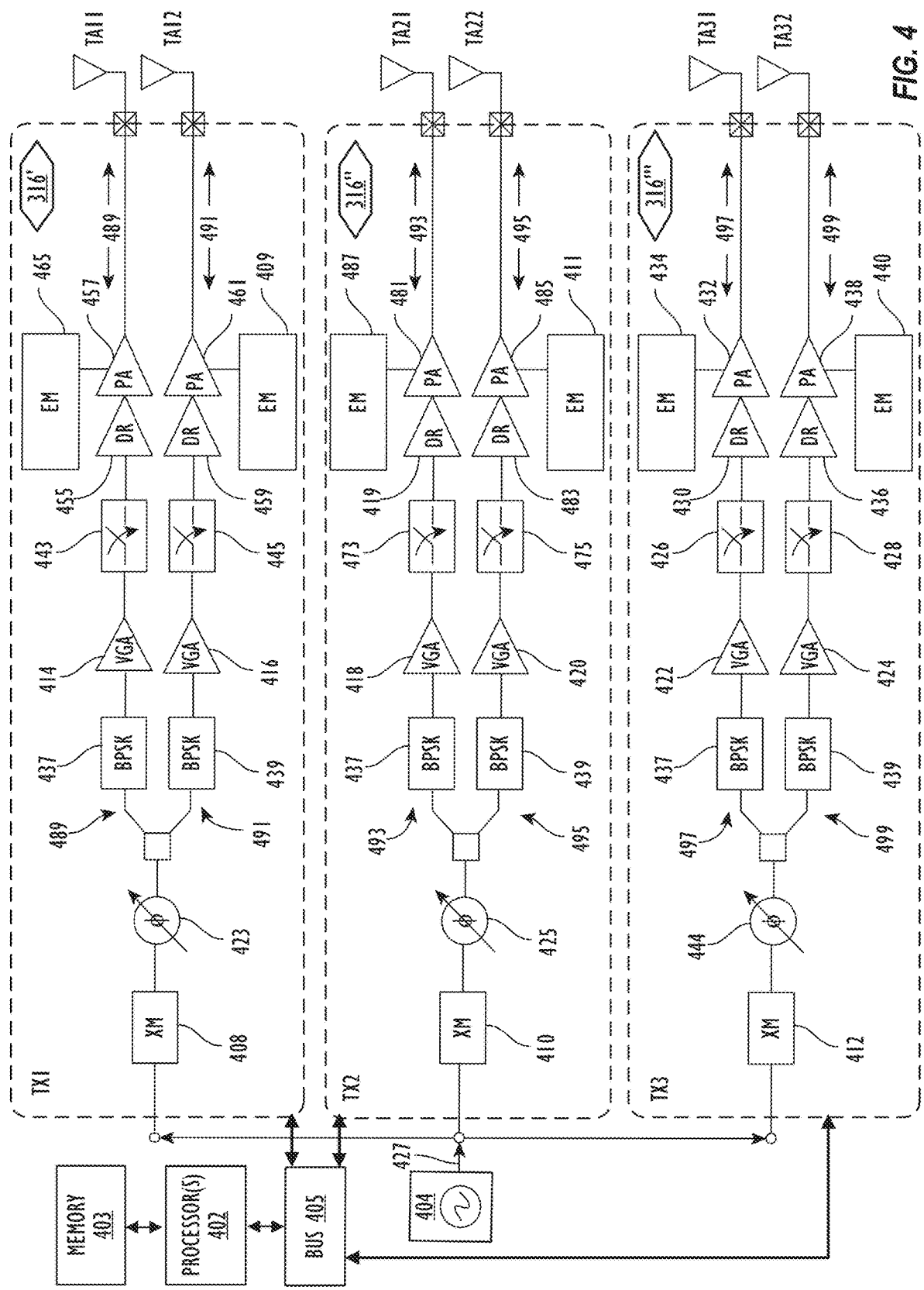
FIG. 4 is a block diagram illustrating aspects of a radio, in accordance with an example of this disclosure.

FIG. 4 illustrates a radio 400 in accordance with an example of this disclosure. The radio 400 (e.g., 300) includes three transmitters (e.g., 306), transmitter TX1, transmitter TX2, and transmitter TX3 connected to a processor (e.g., 212, 314) through a bus 405. Various operations of components of the radio 400 can be controlled by processor 402 to manager thermal conditions in the radio 400 or to manage thermal conditions of client devices with which the radio 400 is in communication. Thermal conditions can include one or more temperatures detected using one or more temperature sensors 316 of the radio 400. In some example implementations, operations of components of the radio 400 are controlled in accordance with instructions stored in a memory 403 (e.g., 214, 315). The memory 403 is a non-transitory computer readable medium. The processor 402 can be local to the radio 400 or can be located elsewhere in a wireless base station of the processor 402, (e.g., wireless base station 104, 105, 204). The first transmitter TX1 includes a first frequency multiplier 408 which multiplies the frequency of a first copy of an oscillation signal 427 from an oscillation signal generator 404 and delivers the higher frequency signal to a first phase rotator 423. The first phase rotator 423 is connected to a first antenna TA11 through a first path 489. The first phase rotator 423 is connected to a second antenna TA12 through a second path 491. The first path 489 comprises a first binary phase shift-keying (BPSK) modulator 437 which is connected to a first switch 443 through a first variable gain amplifier (VGA) 414. The amount of power delivered to VGA 414 can be controlled by the processor 402, e.g., to reduce a thermal output of the VGA 114. When the first switch 443 is closed, the signal from the first VGA 414 passes through a first driver 455 to a first PA 457 to the first antenna TA11. In some example implementations, voltage delivered to PA 457 can be controlled by the processor 402, such as to reduce an amount of heat produced by PA 457. In some example implementations, the envelope of the signal emitted from the first PA 457 can be modulated by a first envelope modulator 465, e.g., to reduce a thermal output of PA 457. The second path 491 comprises a second BPSK modulator 439 which is connected to a second switch 445 through a second variable gain amplifier (VGA) 416. The amount of power delivered to VGA 416 can be controlled by the processor 402, e.g., to reduce a thermal output of VGA 116. When the second switch 445 is closed the signal from the second VGA 416 passes through a second driver 459 to a second PA 461 to the second antenna TA12. In some example implementations, power delivered to PA 461 can be controlled by the processor 402, such as to reduce an amount of heat produced by PA 461. In at least one example, the envelope of the signal emitted from the second PA 461 can be modulated by a second envelope modulator 409.

The second transmitter TX2 includes a second frequency multiplier 410 which multiplies the frequency of a second copy of the oscillation signal 427 from the oscillation signal generator 404 and delivers the higher frequency signal to a second phase rotator 425. The second phase rotator 425 is connected to a third antenna TA21 through a third path 493. The second phase rotator 425 is connected to a fourth antenna TA22 through a fourth path 495. The third path 493 comprises a third BPSK modulator 467 which is connected to a third switch 473 through a third VGA 418. In one or more examples, the amount of power delivered to VGA 418 can be controlled by the processor 402, e.g., to reduce a thermal output of VGA 418. When the third switch 473 is closed, the signal from the third VGA 418 passes through a third driver 419 and third PA 481 to the antenna TA21. In at least one example, power delivered to PA 481 can be controlled by the processor 402, e.g., to reduce an amount of heat produced by PA 481. In at least one example, the envelope of the signal emitted from the third PA 481 can be modulated by a third envelope modulator 487. The fourth path 495 comprises a fourth BPSK modulator 469 which is connected to a fourth switch 475 through a fourth VGA 420. In an example, the amount of power delivered to VGA 420 can be controlled by the processor 402, e.g., to reduce a thermal output of VGA 420. When the fourth switch 475 is closed, the signal from the fourth VGA 420 passes through a fourth driver 483 and a fourth PA 485 to the fourth antenna TA22. In another example, voltage applied by PA 485 can be controlled by the processor 402, e.g., to reduce an amount of heat produced by PA 485. In some examples, the envelope of the signal emitted from the fourth PA 485 can be modulated by a fourth envelope modulator 411.

The third transmitter TX3 includes a third frequency multiplier 412 which multiplies the frequency of a third copy of the oscillation signal 427 from the oscillation signal generator 404 and delivers the higher frequency signal to a third phase rotator 444. The third phase rotator 444 is connected to a fifth antenna TA31 through a fifth path 497. The third phase rotator 444 is connected to a sixth antenna TA32 through a sixth path 499. The fifth path 497 comprises a fifth BPSK modulator 437 which is connected to a fifth switch 426 through a fifth VGA 422. In at least one example, the amount of power delivered to VGA 422 can be controlled by the processor 402, such as to control a thermal output of VGA 422. When the fifth switch 426 is closed, the signal from the fifth VGA 422 passes through a fifth driver 430 and fifth PA 432 to the fifth antenna TA31. In another, voltage applied by PA 432 can be controlled by the processor 402, e.g., to reduce a thermal output of PA 432. In some examples, the envelope of the signal emitted from the fifth PA 432 can be modulated by a fifth envelope modulator 434. The sixth path 499 comprises a sixth BPSK modulator 439 which is connected to a sixth switch 428 through a sixth VGA 424. In some examples, the amount of power delivered to VGA 424 can be controlled by the processor 402, such as to reduce an amount of heat produced by VGA 424. When the sixth switch 428 is closed, the signal from the sixth VGA 424 passes through a sixth driver 436 and a sixth PA 438 to the sixth antenna TA32. In accordance with one or more examples of this, voltage delivered to PA 438 can be controlled by the processor 402, e.g., to reduce a thermal output of PA 438. For example, the envelope of the signal emitted from the sixth PA 438 can be modulated by a sixth envelope modulator 440.

The radio 400 supports six transmit channels (one for each antenna). The radio 400 contains three transmit subarrays (one for each phase rotator). The radio 400 thus provides six channels without requiring more power or space than would accompany six channels in existing solutions. Each transmitter (e.g., TX1) has a set of transmission paths, and each set (e.g., 489, 491) of transmission paths shares a phase rotator (e.g., 423). As noted, the radio 400 supports six channels which can be used for time-division multiplexing (TDM) modulation, code-division multiplexing (CDM) modulation, and doppler-division multiplexing (DDM) modulation. Components along transmission paths 489, 491, 493, 495, 497, 499 can be controlled by processor 402 to reduce thermal output along such paths.

Figure 5:
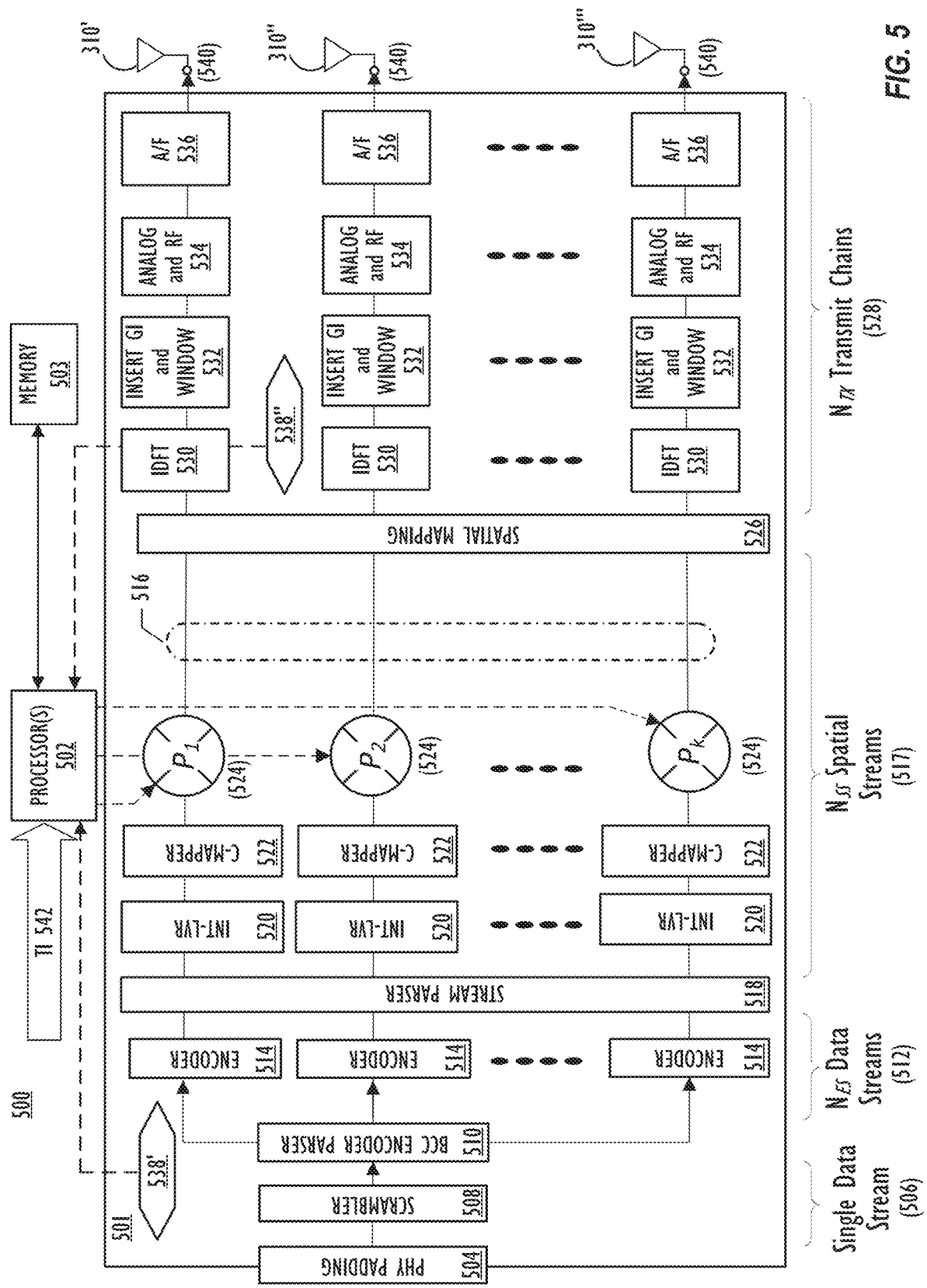
FIG. 5 is another block diagram illustrating aspects of a radio, in accordance with an example of this disclosure.

FIG. 5 is a block diagram illustrating aspects of a radio 500 (e.g., 300, 400), in accordance with an example of this disclosure. The radio 500 includes a transmitter 501 (e.g., 306) and at least one processor 502 (e.g., 212, 314, 402). The radio 500 includes a plurality of components that perform various functions, including the processor 502 and one or more temperature sensors 538 (e.g., 316). Some of the functions may be performed by fewer components, with some components being subsumed within others. For example, in some implementations, functions of one or more of the circuits shown may be performed by or controlled by one or more processors 502. In some examples, functions of one or more of the circuits are performed or controlled by one or more processors 502 in accordance with instructions stored in a memory 503 (e.g., 403, 315, 214) and executed by the one or more processors 502. Memory 503 is a non-transitory computer readable medium. In one or more examples, the processor 502 may be operable to change an operating frequency of the transmitter 501. In one or more examples, the processor 502 may be operable to change the operating frequency of the transmitter 501 based one or more temperature readings taken by one or more of the temperature sensors 538. The temperature sensors 538 may be located proximate one or more components of the transmitter 501. The processor 502 controls functions of the transmitter 501 based on temperature information (TI) 542 received from a host processor (212) or another processor (e.g., 314) of the wireless base station (204). In some examples, at least some of the components of the radio 500 reside on an integrated circuit. In at least one example, the radio 500 is a WLAN transceiver.

The transmitter 501 distributes a (single) data stream 506 as a plurality of sub-streams 516. The transmitter 501 allocates power (P) to each sub-stream 516 of the plurality of sub-streams 516 and converts the sub-streams 516 into one or more transmit signals 540. In accordance with various example implementations, the transmit signals 540 form a channel (not shown) over which the radio 500 communicates with one or more stations and one or more repeaters. Allocating power to a sub-stream 516 can include increasing the signal strength of that sub-stream 516. The transmitter 501 is coupled to the processor 502, and the processor 502 is operable to alter operations of the transmitter 501 based on status information such as TI 542 corresponding to the sub-streams 516 and the transmit chains 528 of the transmit signals 540. In some examples, the processor 502 is operable to adjust the amount of power (P) allocated 524 to individual sub-streams 516 to adjust a channel error rate of the transmitter's channel based on the TI 542. The processor 502 can be operable to determine the power allocations 524 by solving one or more optimization problems (e.g., for balancing an error rate of the data stream 506 against the heat created by the transmitter 501 in producing and transmitter the data stream 506).

The radio 500 includes a PHY circuit 504. The PHY circuit 504 implements physical layer functions of the radio 500 consistent with the Open Systems Interconnection (OSI) model known to those of skill in the art. The PHY circuit 504 connects some components of the radio 500 to a physical medium, such as a receiver antenna (e.g., 312) or other components of the wireless base station 104. The PHY circuit 504 receives a data stream 506 originating at some such physical medium. When needed, the PHY circuit 504 may include a PAD field (e.g., PHY padding-bits) in the data stream 506. The PHY padding-bits are used to match the number of coded bits of the last symbol in the stream 506 to a predetermined criterion. The PHY circuit 504 outputs the data stream 506 to the scrambler circuit 508. The scrambler circuit 508 outputs the (scrambled) single data stream 506 to the binary convolutional coding (BCC) or low-density parity-check (LDPC) encoding and parsing circuit 510. The BCC or LDPC encoding and parsing circuit 510 parses the single data stream 506 into multiple data streams 512. Encoding and parsing circuit 510 demultiplexes the scrambled bits of the data stream 506 among a plurality ($N_{ES}$) of encoders 514. The encoders 514 encode the multiple data streams 512. The multiple data streams 512 are then parsed into multiple (K) sub-streams 516 by the stream-parsing circuit 518.

The multiple (K) sub-streams 516 correspond to $N_{SS}$ spatial streams 517. After parsing by the stream-parsing circuit 518, each sub-stream 516 passes to an interleaving circuit 520 which interleaves the bits of each sub-stream 516 (e.g., changes order of bits) to minimize the presence of long sequences of adjacent noisy bits in the sub-streams 516. In some example implementations, interleaving is applied only when BCC encoding is used. Each sub-stream 516 is received by a constellation mapper circuit 522, which maps the sequence of bits in each sub-stream 516 to constellation points (e.g., complex numbers).

Each sub-stream 516 of the K sub-streams 516 is allocated 524 (P) power. As shown in FIG. 5, a first sub-stream 516' is allocated 524 $P_1$ power, a second sub-stream 516" is allocated $P_2$ power, and so on through the $K^{th}$ sub-stream 516''', which is allocated $P_K$ power. In some example implementations, the total amount of power which can be allocated to the sub-streams 516 cannot exceed a power limit. The sum of all power allocations 524 can be fixed. The total amount of power that can be allocated to the streams 516 can be adjusted by the processor 502 based on temperature readings gathered by one or more temperature sensors, (e.g., 538). In such situation, the power allocations 524 would be subject to a revised power ceiling (e.g., total power limit). For example, the amount of power to one or more sub-streams 516 is reduced due to temperature readings taken by one or more temperature sensors 538. If one or more antennas 310 are creating an amount of heat greater than is desirable, it can be advantageous to reduce power allocated to the one or more transmit antennas 310 in question. It can be advantageous to reduce power allocated to one or more transmit antennas 310 antennas to zero. When power allocated to one or sub-streams 516 or transmit chains 528 is reduced (as part of a control scheme), power allocated to one or more other sub-streams 516 or transmit chains 528 is increased.

The data of the sub-streams 516 can be spatially mapped by mapping circuit 526 using a spatial mapping matrix. Mapping circuit 526 maps the sub-streams 516 (e.g., space-time streams) to multiple transmit chains 528. Mapping the sub-streams 516 can include direct mapping, in which constellation points from each sub-stream 516 are mapped directly onto the transmit chains 528 (e.g., one-to-one mapping). In some examples, mapping the sub-streams 516 by the mapping circuit 526 includes spatial expansion, in which vectors of constellation points from the sub-streams 516 are expanded using matrix multiplication to produce the input to the transmit chains 528. In some examples, mapping the sub-streams 516 by the mapping circuit 526 includes beamforming, in which each vector of constellation points from the sub-streams 516 is multiplied by a matrix of steering vectors to produce the input to the transmit chains 528. In at least one example, the mapping circuit 526 modulates the sub-streams 516 in accordance with an orthogonal frequency-division multiplexing (OFDM) modulation scheme. The sub-streams 516 can thus be tones of OFDM modulation. The sub-streams 516 are a collection of spatial streams 517 of tones of OFDM modulation. In some examples, the processor uses OFDM and allocates 524 power for each OFDM tone.

Spatially mapped data of the sub-streams 516 are input to inverse discrete Fourier transform (IDFT) circuits 530 for conversion from the frequency domain to the time domain before transmission. Other operations can be performed on the data of the transmit chains 528. For example, a guard interval and windowing circuit 532 can insert guard intervals within the data of the transmit chains 528. Guard interval insertion can include prepending a circular extension of a symbol to that symbol. Guard interval and windowing circuit 532 can window data of the transmit chains 528. Windowing can include smoothing the edges of each symbol to increase spectral decay. An analog and radio frequency circuit 534 upconverts the complex baseband waveform from the guard interval and windowing circuit 532 to a radio frequency (RF) signal according to the center frequency of the desired channel. The RF signal of each transmit chain 528 is thereafter amplified using one or more amplifiers and filtered (A/F) using one or more filters, which are depicted collectively by A/F unit 536. The amplifiers of the A/F unit include power amplifiers (PA). After passing through A/F unit 536, the RF signals of the transmit chains 528 are transmitted as transmit signals 540 using the transmit antennas 310. The processor 502 is operable to modify an operating state of one or more components of the radio 500 to manage thermal conditions of the radio 500.

Figure 6:
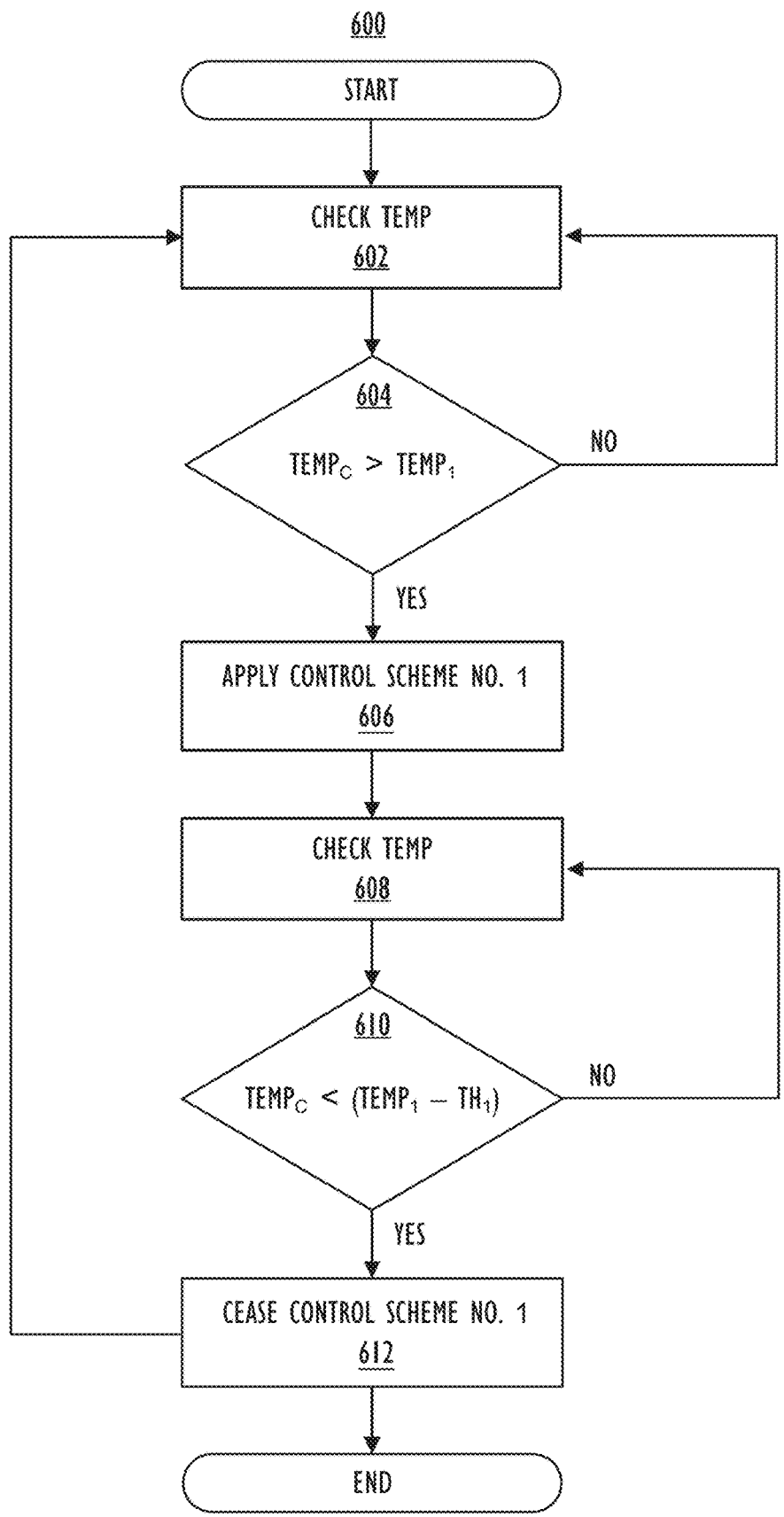
FIG. 6 illustrates a method of adaptively mitigating effects of thermal dissipation in a wireless communications system, in accordance with an example of this disclosure.

FIG. 6 illustrates a method 600 of adaptively mitigating effects of thermal dissipation, in accordance with an example of this disclosure. A processor (e.g., 402, 502) checks 602 a temperature (Temp) of a location in the wireless base station (e.g., 104, 105, 204) using a temperature sensor (e.g. 316, 538). If the processor 402, 502 determines 604 that the current temperature at the location is not too high, the processor will check 602 the temperature again after a short delay. On the other hand, if the processor 402, 502 determines 604 that the current temperature at the location is too high, e.g., the current temperature exceeds $Temp_1$, the processor applies 606 a control scheme to lower the temperature. The control scheme can include implementation of one or more of various steps, such as steering a client device (e.g., station STA-3, see FIG. 2) from one radio (e.g., 206) to a different radio (e.g., 205). The control scheme can include switching a radio from operating in a first mode (e.g., using a first set of amplification levels) to operating in a second mode (e.g., using a second set of lower amplification levels). After applying 606 the control scheme, the processor 402, 502 will check 608 the current temperature at the location using a temperature sensor. In at least one example, the temperature sensor used to check 608 the temperature is the same sensor that was used to make the previous check 602. After checking 608 the temperature, if the processor determines 610 that the current temperature $Temp_C$ has fallen below a predetermined value (e.g., $Temp_1$ minus a threshold $TH_1$ appropriate for the thermal problem for which the first control scheme was indicated), the processor will stop 612 applying the first control scheme—e.g., steer the client device back to the radio (e.g., 206) that the client device had initially been using to access the communication network 102. Thereafter, the processor will return to checking 602 the temperature as previously described. On the other hand, if the processor determines 610 that the temperature has not fallen to a desired level (e.g., below $Temp_1$-$TH_1$), the processor will check 608 the temperature again after a short delay. The processor does not stop applying the control scheme until the processor determines 610 that the temperature has fallen to a low enough level.

Figure 7:
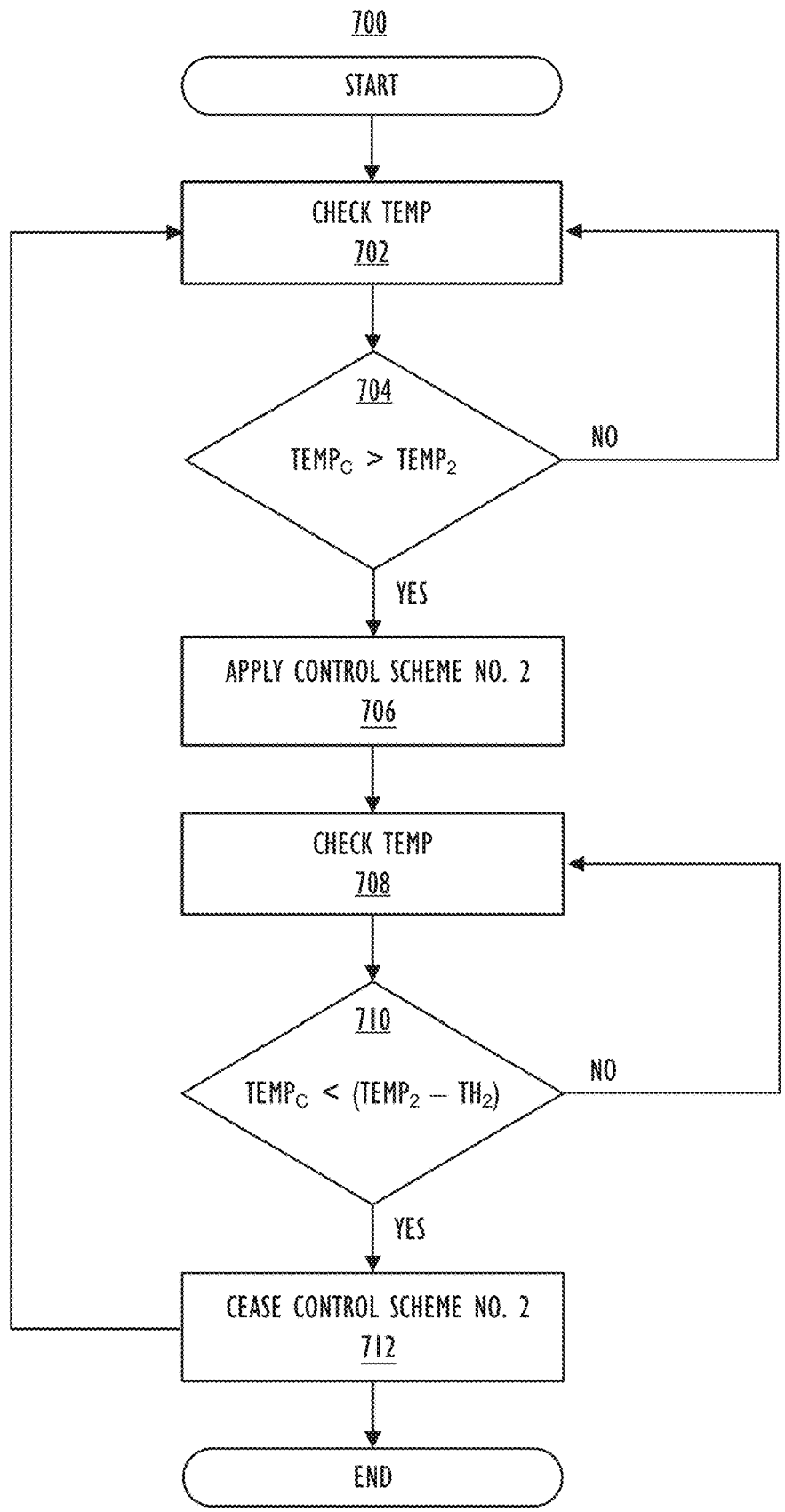
FIG. 7 illustrates another method of adaptively mitigating effects of thermal dissipation in a wireless communications system, in accordance with an example of this disclosure.

FIG. 7 illustrates another method 700 of adaptively mitigating effects of thermal dissipation, in accordance with an example of this disclosure. A processor (e.g., 402, 502) checks 702 a temperature ($Temp_C$) of a location in the wireless base station (e.g., 104, 105, 204) using a temperature sensor (e.g. 316, 538). If the processor 402, 502 determines 704 that the current temperature at the location is not too high, the processor will check 702 the temperature again after a short delay. On the other hand, if the processor 402, 502 determines 704 that the current temperature at the location is too high, e.g., the current temperature exceeds Tempe, the processor applies 706 a control scheme to the problem to lower the temperature. The control scheme can be one or more of various steps, such as causing a radio (e.g., 205) to reduce or eliminate power to one or more antennas of the radio. After applying 706 the second control scheme, the processor 402, 502 will check 708 the current temperature at the location using a temperature sensor. In at least one example, the temperature sensor used to check 708 the temperature is the same sensor that was used to make the previous check 702. After checking 708 the temperature, if the processor determines 710 that the current temperature $Temp_1$ has fallen below a predetermined value (e.g., $Temp_2$ minus a threshold $TH_2$ appropriate for the thermal problem for which the second control scheme was indicated), the processor will stop 712 applying the second control scheme—e.g., turning one or more antennas of the radio back on. On the other hand, if the processor determines 710 that the temperature has not fallen to a desired level (e.g., below $Temp_2$-$TH_2$), the processor will continue to apply 706 the second control scheme, and check 708 the temperature again after a short delay. The processor does not stop applying the control scheme until the processor determines 710 that the temperature has fallen to a low enough level.

The control schemes discussed regarding FIG. 6 and FIG. 7 are non-limiting examples. Control schemes can include causing one or more radios (e.g., 300) to operate in different frequency band, or to communicate with a different radio (e.g., 205, 206, 300), wireless base station 104, 105, 204, or with a different repeater. Control schemes can involve stopping one or more radios (e.g., 205, 300) from operating in a first mode in which the one or more radios (e.g., 205, 300) communicate in a the frequency band or communicate with one or more other radios (e.g., of a station) and causing the one or more radios (e.g., 205, 300) to operate in a second mode in which the one or more radios (e.g., 205, 300) do not communicate in the frequency or do not communicate with the one or more other radios. Changing one or more radios (e.g., 210, 400) from operating in a first mode to operating in a second mode can include transmitting, communication-instructions to a client device, such as instructions to use a different radio (e.g., 206, 500) to communicate with a processor (e.g., 402) or instructions to use a different frequency band. In some examples, the communication-instructions are sent by the one or more radios (e.g., 210, 400) changing operating modes. In some examples, the communication-instructions are sent using a different radio (e.g., 206, 300).

In an example, a wireless communications system 100, 111 or wireless base station 104, 105, 204 includes a radio (e.g., 205, 206, 300); one or more temperature sensors 316, 538 coupled to the radio (e.g., 400); and a processor 212, 314, 402, 502 coupled to the radio (e.g., 400) and the one or more temperature sensors 316, 538, wherein the processor 314, 402, 502 is operable to: cause the radio (e.g., 400) to operate in a first mode (e.g., at a first frequency band), wherein operating the radio (e.g., 400) in the first mode uses a first amount of power; detect, using a first temperature sensor from among the one or more temperature sensors 316, 538, a first temperature at a first time; determine that the first temperature exceeds a first threshold; cause, responsive to determining that the first temperature exceeds the first threshold, the radio (e.g., 400) to operate in a second mode (e.g., a lower frequency band than the first frequency band) instead of the first mode, wherein causing the radio (e.g., 400) to operate in the second mode comprises causing the radio (e.g., 300) to use a second amount of power which is less than the first amount of power; detect, at a second time, a second temperature using a second temperature sensor from among the one or more temperature sensors 316, 538; determine that the second temperature is lower than a second threshold; and cause, responsive to determining that the second temperature is lower than the second threshold, the radio (e.g., 300) to operate in the first mode instead of the second mode.

In various example implementations, the processor 314, 402, 502 controls operations of a wireless base station 204, a radio 300, a transmit circuit 302, or a receive circuit 304 by executing instructions stored in memory 214, 315, 403, 503. In at least one example, the instructions comprise instructions to: cause a radio (e.g., 210) to operate in a first mode, wherein operating the radio (e.g., 210) in the first mode uses a first amount of power; detect, using a first temperature sensor 316, 538, a first temperature at a first time; determine that the first temperature exceeds a first threshold; cause, responsive to determining that the first temperature exceeds the first threshold, the radio (e.g., 300) to operate in a second mode instead of the first mode, wherein causing the radio (e.g., 300) to operate in the second mode comprises causing the radio (e.g., 400) to use a second amount of power which is less than the first amount of power; detect, at a second time, a second temperature using a second temperature sensor 316, 538; determine that the second temperature is lower than a second threshold; and cause, responsive to determining that the second temperature is lower than the second threshold, the radio (e.g., 400) to operate in the first mode instead of the second mode.

Though the operations described herein may be set forth sequentially for explanatory purposes, in practice the method may be carried out by multiple components operating concurrently and perhaps even speculatively to enable out-of-order operations. The sequential discussion is not meant to be limiting. Modifications, equivalents, and alternatives, should be apparent to those skilled in the art. It is intended that the following claims be interpreted to embrace all such modifications, equivalents, and alternatives.

What is claimed is:

1. A method comprising:
   monitoring thermal conditions in a networking device comprising one or more network interfaces;
   analyzing communication activity of the one or more network interfaces to determine possible operating configurations to service the communication activity; and
   in view of a thermal range, adaptively controlling the operating configurations to regulate the thermal conditions in the networking device to be within the thermal range while optimizing service for the communication activity, wherein adaptively controlling the operating configurations comprises at least one of:
   directing a portion of the communication activity to a different interface of the one or more network interfaces; or
   identifying one or more protocols, traffic type, service levels, or client capabilities associated with portions of the communication activity.

2. The method of claim 1, wherein adaptively controlling the operating configurations comprises reconfiguring parameters of the one or more network interfaces.

3. The method of claim 1, wherein adaptively controlling the operating configurations comprises selecting from the operating configurations from the possible operating configurations based on a difference between the monitored thermal conditions and a thermal threshold in view of service levels for portions of the communication activity.

4. The method of claim 1, wherein to determine the possible operating configurations comprises: modeling thermal changes of components in the networking device for different control schemes based on characteristics of the analyzed communication activity.

5. The method of claim 1, wherein to determine the possible operating configurations comprises: identifying different parameters of the one or more network interfaces that are compatible with characteristics of the analyzed communication activity.

6. The method of claim 1, further comprising inventorying the operating configurations and characteristics of the communication activity when the monitored thermal conditions leave and return the thermal range to learn possible operating configuration.

7. The method of claim 1, wherein determining the possible operating configurations is based on one or more of:
   reducing an error vector magnitude for a radio of an interface;
   reducing power allocated to one or more transmit chains of a radio of an interface; or
   operating a power amplifier at non-linear range.

8. The method of claim 1, wherein the operating configurations for one or more wireless network interfaces include different MIMO modes using different quantities of transmit antennas.

9. The method of claim 1, wherein adaptively controlling the operating configurations comprises changing power amplifier operating parameters based on the monitored thermal conditions.

10. The method of claim 1, wherein adaptively controlling the operating configurations is based a service level for communication activity associated with one or more of:
    capping a duty cycle for a specific communication client;
    switching a frequency band for a portion of communication activity;
    adjusting power allocated to one or more transmit chains of one or more radios; or
    changing a protocol governing a portion of the communications activity to an older compatible version of the protocol.

11. The method of claim 1, wherein adaptively controlling the operating configurations comprises adjusting power allocated to one or more transmit chains of one or more radios; and changing a MIMO order of at least one of one or more radios for a wireless network interface.

12. The method of claim 1, wherein optimizing service for the communication activity is based on minimal service levels for portions of the communication activity and/or corresponding parameters of the one or more networking interfaces.

13. The method of claim 1,
    wherein the communication activity includes wireless communication with client device; and
    wherein adaptively controlling the operating configurations comprises transmitting instructions to the client device, wherein the instructions indicate for the client to switch to a different frequency band for subsequent communication with the wireless networking device.

14. The method of claim 1, wherein the one or more network interfaces comprises one or more Wi-Fi, Bluetooth, cellular, Zigbee, USB, or ethernet interfaces.

15. The method of claim 1, wherein the thermal range is adjusted based on ambient temperature external to the networking device, wherein the ambient temperature is requested from a remote device.

16. A non-transitory computer readable medium storing instructions executable by a processor, wherein the instructions, when executed, are configured to cause a system to perform operations comprising:
    monitor thermal conditions in a networking device;

analyze communication activity of one or more network interfaces to determine possible operating configurations to service a communication activity; and in view of a thermal range, adaptively control the operating configurations to regulate the thermal conditions in the networking device to be within a thermal range while optimizing service for the communication activity, wherein to adaptively control the operating configurations, the system is caused to perform at least one of:

direct a portion of the communication activity to a different interface of the one or more network interfaces; or identify one or more protocols, traffic type, service levels, or client capabilities associated with portions of the communication activity.

17. The non-transitory computer readable medium of claim 16, wherein the possible operating configurations are learned based on the operating configurations and characteristics of the communication activity when the monitored thermal conditions leave and return the thermal range.

18. A networking device, comprising
one or more network interfaces;
one or more temperature sensors; and
a processor operatively coupled to the one or more network interfaces and the one or more temperature sensors, wherein the processor is operable to:

monitor thermal conditions in the networking device;

analyze communication activity of the one or more network interfaces to determine possible operating configurations to service the communication activity; and in view of a thermal range, adaptively control the operating configurations to regulate the thermal conditions in the networking device to be within the thermal range while optimizing service for the communication activity, wherein to adaptively controlling the operating configurations, the processor is to:

select a frequency band with lower power consumption for one or more client devices in view of characteristics of communication activity with the respective client device.

19. The networking device of claim 18, wherein the one or more network interfaces include wireless interfaces to communicate with different frequency bands, and wherein the networking device is communicating with one or more client devices.

* * * * *